United States Patent
Stesel et al.

(10) Patent No.: US 9,050,576 B2
(45) Date of Patent: Jun. 9, 2015

(54) DEVICE AND METHOD FOR MAKING A DILUTE AQUEOUS SOLUTION OF PEROXOMONOSULPHURIC ACID

(71) Applicant: Evonik Degussa GmbH, Essen (DE)

(72) Inventors: Peter Stesel, Hamilton (NZ); Darren Townsend, Morrinsville (NZ); Thomas Barratt, Omokoroa (NZ)

(73) Assignee: Evonik Degussa, GmbH, Essen (DE)

( * ) Notice: Subject to any disclaimer, the term of this patent is extended or adjusted under 35 U.S.C. 154(b) by 0 days.

(21) Appl. No.: 14/345,641

(22) PCT Filed: Sep. 19, 2012

(86) PCT No.: PCT/EP2012/068391
§ 371 (c)(1),
(2) Date: Mar. 18, 2014

(87) PCT Pub. No.: WO2013/041546
PCT Pub. Date: Mar. 28, 2013

(65) Prior Publication Data
US 2015/0064101 A1    Mar. 5, 2015

(30) Foreign Application Priority Data

Sep. 21, 2011 (EP) ..................................... 11182103

(51) Int. Cl.
*C01B 15/08* (2006.01)
*C01B 17/80* (2006.01)
(Continued)

(52) U.S. Cl.
CPC . *B01J 14/00* (2013.01); *C01B 15/06* (2013.01)

(58) Field of Classification Search
CPC ........... C01B 15/08; C01B 17/80; B01J 14/00

USPC .................................. 423/513; 422/160, 161
See application file for complete search history.

(56) References Cited

U.S. PATENT DOCUMENTS

| 1,985,902 A | 6/1935 | MacDonald |
| 2,789,954 A | 4/1957 | Fell |

(Continued)

FOREIGN PATENT DOCUMENTS

| EP | 2 075 230 A1 | 7/2009 |
| WO | WO 92/07791 A1 | 5/1992 |

(Continued)

OTHER PUBLICATIONS

International Search Report for PCT/EP2012/068391 filed Sep. 19, 2012.

(Continued)

*Primary Examiner* — Timothy Vanoy
(74) *Attorney, Agent, or Firm* — Law Office of: Michael A. Sanzo, LLC

(57) ABSTRACT

A device, comprising a conduit for an aqueous stream, a mixing tube located inside the conduit, having a static mixer inside the mixing tube, an outlet open to the conduit and an inlet, a sulphuric acid supply tube connected to the inlet of the mixing tube and a hydrogen peroxide supply tube, arranged inside the sulphuric acid supply tube and having an outlet for hydrogen peroxide at the inlet of said mixing tube, and a method, where an aqueous stream is passed through the conduit of the device, 85 to 98% by weight sulphuric acid is introduced to the sulphuric acid supply tube of the device and 50 to 80% by weight aqueous hydrogen peroxide solution is introduced to the hydrogen peroxide supply tube of the device, provide a dilute aqueous solution of peroxomonosulphuric acid without a risk of exposing operating personnel to concentrated peroxomonosulphuric acid.

17 Claims, 1 Drawing Sheet

(51) Int. Cl.
*B01J 14/00* (2006.01)
*C01B 15/06* (2006.01)

(56) References Cited

U.S. PATENT DOCUMENTS

| | | | |
|---|---|---|---|
| 2,899,272 A * | 8/1959 | Flach et al. | 423/513 |
| 3,644,296 A | 2/1972 | Bosch | |
| 5,141,731 A | 8/1992 | Meier et al. | |
| 5,304,360 A | 4/1994 | Lane et al. | |
| 5,439,663 A | 8/1995 | Manganaro et al. | |
| 5,879,653 A | 3/1999 | Castrantas et al. | |
| 6,368,570 B1 | 4/2002 | Dilber | |
| 6,818,142 B2 | 11/2004 | Tufano et al. | |
| 7,807,860 B2 | 10/2010 | Colman et al. | |
| 8,673,234 B2 | 3/2014 | Yows et al. | |
| 2010/0112094 A1 | 5/2010 | Yoshida et al. | |
| 2014/0348740 A1 | 11/2014 | Brown et al. | |

FOREIGN PATENT DOCUMENTS

| | | |
|---|---|---|
| WO | WO 97/26215 A1 | 7/1997 |
| WO | WO 2013/041544 A1 | 3/2013 |

OTHER PUBLICATIONS

Written Opinion of the International Searching Authority for PCT/EP2012/068391 filed Sep. 19, 2012.
International Preliminary Report on Patentability for PCT/EP2012/068391 filed Sep. 19, 2012.
U.S. Appl. No. 14/345,637, filed Mar. 18, 2013, Brown.
Notice of Allowance for copending U.S. Appl. No. 14/345,637, sent Dec. 3, 2014.

* cited by examiner

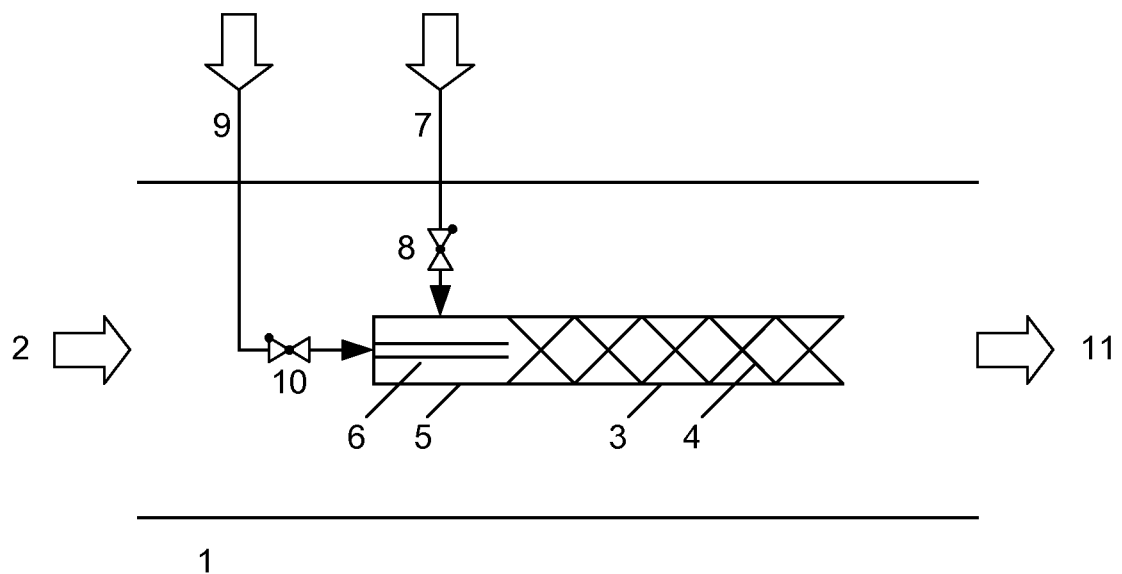

DEVICE AND METHOD FOR MAKING A DILUTE AQUEOUS SOLUTION OF PEROXOMONOSULPHURIC ACID

CROSS REFERENCE TO RELATED APPLICATIONS

The present application is US national stage of international application PCT/EP2012/068391, which had an international filing date of Sep. 19, 2012 and which was published in English on Mar. 28, 2013. Priority is claimed to European application EP 11182103.9, filed on Sep. 21, 2011.

FIELD OF THE INVENTION

The invention relates to a device for making a dilute aqueous solution of peroxomonosulphuric acid.

BACKGROUND OF THE INVENTION

Peroxomonosulphuric acid is a strong oxidant which reacts faster than hydrogen peroxide and can be readily made from concentrated sulphuric acid and aqueous hydrogen peroxide, as known from U.S. Pat. No. 2,789,954. The concentrated peroxomonosulphuric acid solution obtained from concentrated sulphuric acid and aqueous hydrogen peroxide is a hazardous chemical and poses a work hazard for operating personnel with a low qualification in handling hazardous chemicals. In many applications, such as in mining and water purification, peroxomonosulphuric acid is not used in concentrated form, but as a dilute aqueous solution.

U.S. Pat. No. 2,789,954 describes a method of making concentrated peroxomonosulphuric acid by flowing together a stream of concentrated sulphuric acid and a stream of hydrogen peroxide at the mouth of a water-cooled condenser, so that the resulting mixture is cooled within several seconds. The cooled mixture is then diluted to 6% by weight peroxomonosulphuric acid by mixing with a stream of water and passing the resulting mixture through a second condenser. The device used in U.S. Pat. No. 2,789,954 is useful only on a laboratory scale, but cannot be scaled up safely to an industrial scale.

WO 92/07791 describes a method of making peroxomonosulphuric acid in an adiabatic reactor, where hydrogen peroxide is injected into a stream of sulphuric acid, flowing through an annular reaction chamber, through an inlet directing the hydrogen peroxide transversely to the sulphuric acid flow. The document proposes to allow the hot concentrated peroxomonosulphuric acid to flow directly into a tank or vessel in which its use is desired or in the alternative to flow it through a pipe immersed in a treatment tank in order to cool it.

However, there still remains a need for a device and a method that provides a dilute aqueous solution of peroxomonosulphuric acid without a risk of exposing operating personnel to a concentrated peroxomonosulphuric acid solution. The instant inventors have developed a device and a method that meets this need.

SUMMARY OF THE INVENTION

One object of the invention is a device for making a dilute aqueous solution of peroxomonosulphuric acid, comprising a conduit (1) for an aqueous stream (2), a mixing tube (3) located inside said conduit, having a static mixer (4) inside the mixing tube, an outlet open to said conduit and an inlet, a sulphuric acid supply tube (5) connected to the inlet of said mixing tube and a hydrogen peroxide supply tube (6), arranged inside the sulphuric acid supply tube and having an outlet for hydrogen peroxide at the inlet of said mixing tube.

A further object of the invention is a method for making a dilute aqueous solution of peroxomonosulphuric acid (11), wherein an aqueous stream (2) is passed through the conduit (1) of a device according to the invention, 85 to 98% by weight sulphuric acid is introduced to the sulphuric acid supply tube (5) of said device and 50 to 80% by weight aqueous hydrogen peroxide solution is introduced to the hydrogen peroxide supply tube (6) of said device.

BRIEF DESCRIPTION OF THE DRAWINGS

FIG. 1 shows a preferred embodiment of the device of the invention having the mixing tube (3) and sulphuric acid supply tube (5) arranged coaxially inside the conduit (1) and additional non-return valves (8, 10) on the sulphuric acid and hydrogen peroxide feed lines (7, 9).

DESCRIPTION OF THE INVENTION

The device of the invention comprises a conduit (1) for an aqueous stream (2), which preferably is a tube and more preferably is a straight tube with a circular cross section.

The device of the invention further comprises a mixing tube (3) located inside the conduit for the aqueous stream. In the preferred embodiment of the conduit being a tube, the mixing tube is preferably arranged coaxially inside the conduit. The mixing tube is preferably lined with a corrosion resistant material, more preferably with a fluorocarbon polymer and most preferably with polytetrafluoroethylene.

The mixing tube has a static mixer (4) arranged inside, which preferably fills the entire cross section of the mixing tube. Any kind of static mixer can be used in the mixing tube, static mixers having repeating mixing elements being preferred. Most preferably, a static mixer having from 2 to 20 mixing elements is used. The static mixer is preferably made of a corrosion resistant material, more preferably of a fluorocarbon polymer and most preferably of polytetrafluoroethylene. In a preferred embodiment, the mixing tube is arranged exchangeably inside the conduit in order to easily adapt the device to different throughput ranges by exchanging mixing tubes of different size and volume.

The outlet of the mixing tube (3) is open to the conduit (1), so any liquid leaving the mixing tube through the outlet will flow into the conduit for the aqueous stream. The outlet of the mixing tube is preferably in the flow direction of the aqueous stream, that is liquid flowing through the outlet into the aqueous stream is directed in the direction of the aqueous stream.

Arranging the mixing tube inside the conduit for the aqueous stream with the outlet open to the conduit provides efficient cooling of the mixture formed from sulphuric acid and hydrogen peroxide by heat transfer to the aqueous stream and effects rapid dilution of the resulting concentrated peroxomonosulphuric acid in the aqueous stream, which leads to reduced hydrogen peroxide decomposition and high yields of peroxomonosulphuric acid. The arrangement also avoids any exposition of operating personnel to concentrated peroxomonosulphuric acid, because the peroxomonosulphuric acid is formed and diluted inside the conduit for the aqueous stream.

The device of the invention further comprises a sulphuric acid supply tube (5) that is connected to the inlet of the mixing tube (3), the inlet of the mixing tube being the end of the mixing tube that is opposite to the outlet. In the preferred embodiment of the mixing tube being arranged coaxially inside the conduit, the sulphuric acid supply tube is preferably also arranged coaxially inside the conduit. The sulphuric acid supply tube is preferably lined with a corrosion resistant material, more preferably with a fluorocarbon polymer and most preferably with polytetrafluoroethylene.

The device of the invention further comprises a hydrogen peroxide supply tube (6) that is arranged inside the sulphuric acid supply tube (5) and has an outlet for hydrogen peroxide at the inlet of the mixing tube. This way of arranging the hydrogen peroxide supply tube has the advantage of providing efficient mixing of hydrogen peroxide with sulphuric acid as soon as the hydrogen peroxide leaves the hydrogen peroxide supply tube, which reduces hydrogen peroxide decomposition and provides high yields of peroxomonosulphuric acid.

In a preferred embodiment, the device of the invention further comprises a sulphuric acid feed line (7) that is connected to the sulphuric acid supply tube and has a non-return valve (8), and a hydrogen peroxide feed line that is connected to the hydrogen peroxide supply tube and has a non-return valve (10). The non-return valves ensure that peroxomonosulphuric acid formed in the mixing tube cannot be pushed back into storage vessels for hydrogen peroxide and sulphuric acid. Preferably, the non-return valves are arranged inside the conduit for the aqueous stream. This ensures that peroxomonosulphuric acid formed in the mixing tube will be retained inside the conduit and cannot leak from flanges outside the conduit. Preferably, the sulphuric acid feed line and the hydrogen peroxide feed line pass through a common flange cover on the conduit for the aqueous stream, which allows to exchange the complete assembly of flange cover, sulphuric acid feed line, hydrogen peroxide feed line, sulphuric acid supply tube, hydrogen peroxide supply tube and mixing tube in one piece. This embodiment allows a quick exchange of the assembly in order to adapt the device to different throughput ranges.

In another preferred embodiment, the device of the invention further comprises devices for stopping supply of sulphuric acid to the sulphuric acid supply tube and of hydrogen peroxide to the hydrogen peroxide supply tube. These devices are controlled by a flow indicator for the aqueous stream. Any known device for detecting or measuring the flow of an aqueous stream may be used as the flow indicator, such as commercial flow monitors and flow meters. The devices for stopping supply of sulphuric acid and hydrogen peroxide may be for example shut-off valves or circuits for stopping delivery pumps. Preferably, the flow indicator for the aqueous stream stops the supply of sulphuric acid and hydrogen peroxide to the mixing tube when the flow rate of the aqueous stream in the conduit falls below a pre-determined value in order to avoid any accumulation of concentrated peroxomonosulphuric acid in the conduit.

In yet another preferred embodiment, the device of the invention further comprises an additional static mixer located in the conduit for the aqueous stream downstream from the outlet of the mixing tube. The additional static mixer provides a more rapid and even dilution of the concentrated peroxomonosulphuric acid in the aqueous stream and provides a dilute aqueous solution of peroxomonosulphuric acid with a homogeneous concentration of peroxomonosulphuric acid.

In the method of the invention for making a dilute aqueous solution of peroxomonosulphuric acid, an aqueous stream (2) is passed through the conduit (1) of a device of the invention as described above, 85 to 98% by weight sulphuric acid is introduced to the sulphuric acid supply tube (5) of the device and 50 to 80% by weight aqueous hydrogen peroxide solution is introduced to the hydrogen peroxide supply tube (6) of the device in order to provide a dilute aqueous solution (11) of peroxomonosulphuric acid.

The aqueous stream is preferably a stream of water.

Sulphuric acid and hydrogen peroxide are preferably introduced at a molar ratio of from 0.5 to 10 and more preferably at a molar ratio of from 1 to 4. A molar ratio at the upper end of the ranges is preferred if high conversion of hydrogen peroxide is desired. A molar ratio at the lower end of the ranges is preferred if the dilute aqueous solution of peroxomonosulphuric acid will be neutralized with a base before use.

Sulphuric acid and hydrogen peroxide are preferably introduced at rates to provide a weight ratio of the aqueous stream relative to the combined amount of sulphuric acid and hydrogen peroxide within the range from 1 to 10 in order to achieve the desired concentration of peroxomonosulphuric acid in the dilute aqueous solution of peroxomonosulphuric acid.

Sulphuric acid and hydrogen peroxide are preferably introduced at flow rates providing an average residence time in the mixing tube of from 1 to 10 seconds, more preferably from 1 to 7 seconds and most preferably from 1 to 5 seconds, the average residence time being calculated as the ratio between the volume of mixing tube and the combined flow rates of sulphuric acid and hydrogen peroxide. Adjusting the residence time within the preferred range provides high yields of peroxomonosulphuric acid with little peroxide decomposition. In order to achieve a residence time within the preferred range for a given flow of the aqueous stream and a given concentration of peroxomonosulphuric acid in the dilute aqueous solution of peroxomonosulphuric acid, the volume of the mixing tube may be adjusted by exchanging the mixing tube for a smaller or larger mixing tube.

The device and the method of the invention allow the safe production of a dilute aqueous solution of peroxomonosulphuric acid at low cost and in large volumes without a risk of exposing operating personnel to concentrated peroxomonosulphuric acid. The heat transfer from the mixture of sulphuric acid and hydrogen peroxide to the surrounding aqueous stream which occurs during formation of peroxomonosulphuric acid in the mixing tube also provides for safe operation of the process and avoids thermal peroxide decomposition.

The invention claimed is:

1. A device for making a dilute aqueous solution of peroxomonosulphuric acid, comprising:
   a) a conduit for an aqueous stream;
   b) a mixing tube located inside said conduit, having a static mixer inside the mixing tube, an outlet open to said conduit and an inlet;
   c) a sulphuric acid supply tube connected to the inlet of said mixing tube; and
   d) a hydrogen peroxide supply tube, arranged inside the sulphuric acid supply tube and having an outlet for hydrogen peroxide at the inlet of said mixing tube.

2. The device of claim 1, wherein said mixing tube and said sulphuric acid supply tube are arranged coaxially inside said conduit.

3. The device of claim 2, wherein the outlet of said mixing tube is in the flow direction of said aqueous stream.

4. The device of claim 1, further comprising a sulphuric acid feed line to said sulphuric acid supply tube, the sulphuric acid feed line having a non-return valve, and a hydrogen peroxide feed line to said hydrogen peroxide supply tube, the hydrogen peroxide feed line having a non-return valve.

5. The device of claim 4, wherein said mixing tube and said sulphuric acid supply tube are arranged coaxially inside said conduit.

6. The device of claim 5, wherein the outlet of said mixing tube is in the flow direction of said aqueous stream.

7. The device of claim 1, further comprising flow interrupting devices, controlled by a flow indicator for said aqueous stream, for stopping supply of sulphuric acid to said sulphuric acid supply tube and of hydrogen peroxide to said hydrogen peroxide supply tube.

8. The device of claim 7, wherein said mixing tube and said sulphuric acid supply tube are arranged coaxially inside said conduit.

9. The device of claim 8, wherein the outlet of said mixing tube is in the flow direction of said aqueous stream.

10. The device of claim 7, further comprising a sulphuric acid feed line to said sulphuric acid supply tube, the sulphuric acid feed line having a non-return valve, and a hydrogen peroxide feed line to said hydrogen peroxide supply tube, the hydrogen peroxide feed line having a non-return valve.

11. The device of claim 1, further comprising an additional static mixer located in said conduit downstream from the outlet of said mixing tube.

12. The device of claim 11, wherein said mixing tube and said sulphuric acid supply tube are arranged coaxially inside said conduit.

13. The device of claim 12, wherein the outlet of said mixing tube is in the flow direction of said aqueous stream.

14. The device of claim 11, further comprising a sulphuric acid feed line to said sulphuric acid supply tube, the sulphuric acid feed line having a non-return valve, and a hydrogen peroxide feed line to said hydrogen peroxide supply tube, the hydrogen peroxide feed line having a non-return valve.

15. A method for making a dilute aqueous solution of peroxomonosulphuric acid, wherein:
   a) an aqueous stream is passed through the conduit of a device according to claim 1;
   b) 85 to 98% by weight sulphuric acid is introduced to the sulphuric acid supply tube of said device; and
   c) 50 to 80% by weight aqueous hydrogen peroxide solution is introduced to the hydrogen peroxide supply tube of said device.

16. The method of claim 15, wherein sulphuric acid and hydrogen peroxide are introduced at a molar ratio of from 0.5 to 10.

17. The method of claim 15, wherein the sulphuric acid and hydrogen peroxide are introduced at rates to provide a weight ratio of the aqueous stream relative to the combined amount of sulphuric acid and hydrogen peroxide within the range from 1 to 10.

* * * * *